March 4, 1958
F. E. AHLBIN
2,825,248
SCISSORS AND METHOD OF MAKING
Filed Nov. 28, 1955
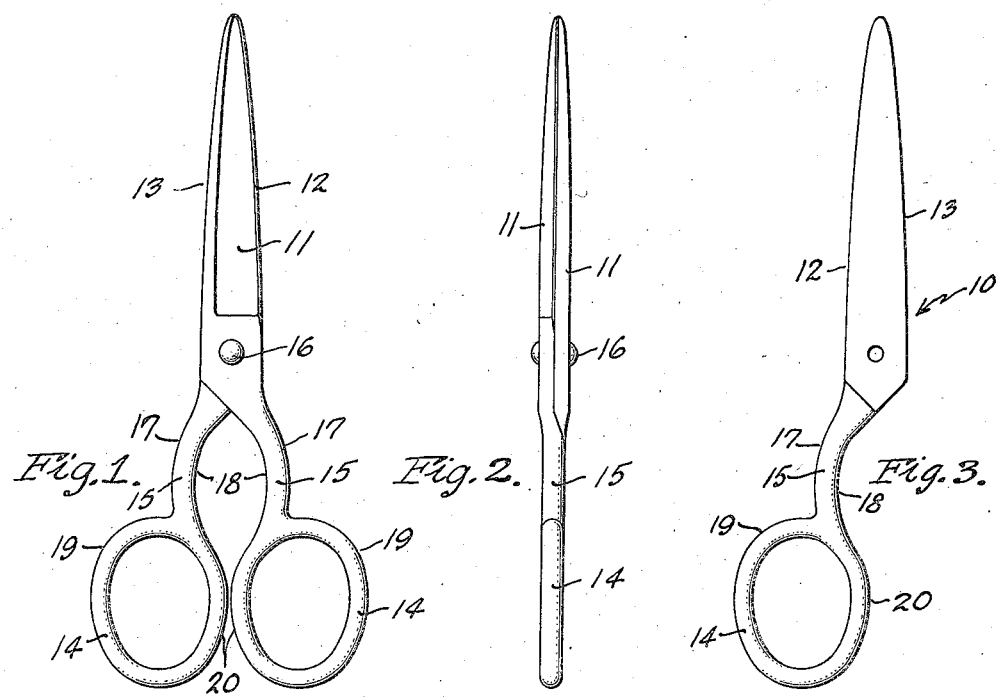
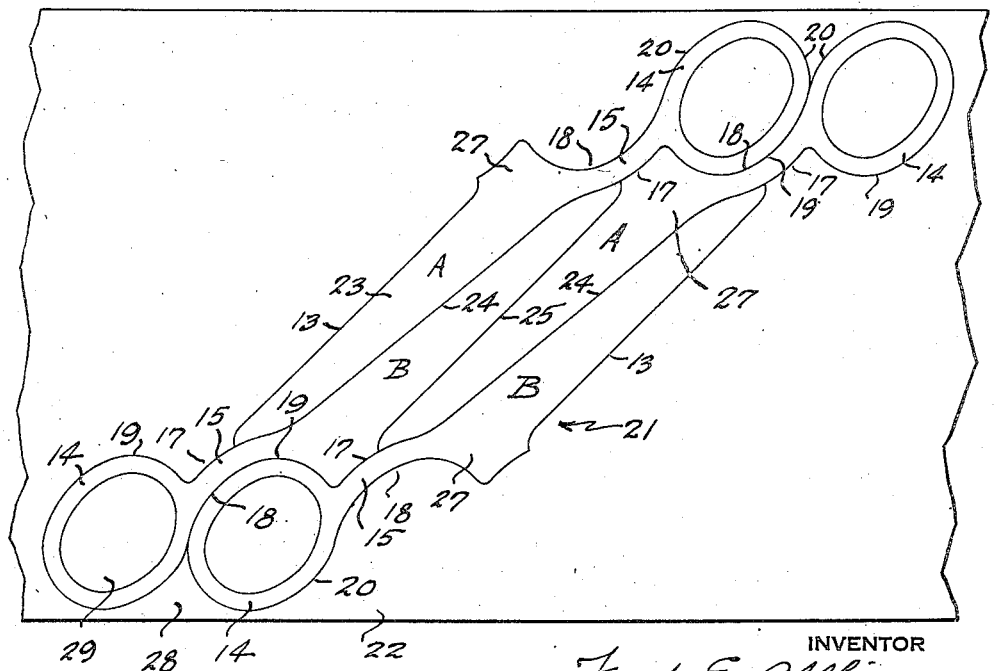
INVENTOR
Fred E. Ahlbin
BY
Worster & Davis
ATTORNEYS.

United States Patent Office 2,825,248
Patented Mar. 4, 1958

2,825,248

SCISSORS AND METHOD OF MAKING

Fred E. Ahlbin, Fairfield, Conn.

Application November 28, 1955, Serial No. 549,392

2 Claims. (Cl. 76—104)

This invention relates to scissors and method of making them, and has for an object to provide an improved scissor and method of making it which will greatly reduce the scrap left in the operation of cutting out the blanks from the metal stock from which the scissors members are formed, and thus greatly reduce the amount of material required and the cost of manufacturing the scissors.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

In this drawing:

Fig. 1 is a side view of a pair of scissors involving this invention and made by this method;

Fig. 2 is an edge view thereof;

Fig. 3 is a side view of one of the pivoted members detached, and

Fig. 4 is a diagrammatical view of a strip of sheet metal stock showing how the blanks are cut from this metal according to this method for making scissors.

In cutting the usual type of scissors blanks from the metal stock, because of their shape they must ordinarily be blanked from the stock at spaced locations, thus leaving considerable stock between the area cut out for each blank, which involves the leaving of a large amount of stock as scrap, which has greatly reduced value over the original cost of the material and therefore greatly increases the cost of making the scissors, as well as requiring a large amount of material. In order to obviate these objections I have devised these improved scissors, which permit a new and improved method of cutting the blanks, from which the members of the scissors are formed, from the metal stock in such a way that the amount of scrap left after cutting the blanks is reduced to a minimum, thus greatly reducing the cost of manufacturing the scissors and greatly reducing the amount of metal required in manufacturing a given number of these scissors.

The completed improved scissors made by this method are shown in Figs. 1 and 2, with Fig. 3 showing one of the scissor members by itself. The scissors comprise a pair of pivoted members 10 each comprising atn elongated tapered blade portion 11 and each having a shear edge 12 and a back edge 13 laterally spaced to thus form the opposite edges of the blade portion, and a handle portion comprising a finger loop 14 of generally ring-shape and preferably substantially circular or somewhat oval in shape, which is connected to one end of the blade portion by an outwardly curved or bowed shank 15, and the elements are pivoted together in overlapped relation by any suitable means, such for example as the rivet 16. The curved or bowed shanks 15 comprise a connecting bar which has a convex outer edge 17 and a concave inner edge 18 which is the same shape as the outer convex edge 19 of the finger loop, the convex portion 19 also forming a continuation of the outer end of the convex outer edge 17 of the shank, and the inner convex edge 20 of the loop forming a continuation of the outer end of the concave inner edge 18 of the shank. By so shaping the blades, finger loops and connecting shanks, the blanks from which they are forged and shaped may be cut or stamped from the metal stock, such as sheet metal of a proper thickness or gauge, side by side in close contact, the line of cutting being the division line between adjacent blanks, so that there is no scrap left between them, the only scrap being that at the outer edges of the strip from which the blanks are cut left by the curvature of the outer ends of the finger grips, and the disc cut out in making the opening through the ring-shaped finger grip.

The arrangement for cutting these blanks, indicated at 21, is shown in Fig. 4. The blank is preferably cut diagonally of the strip or sheet 22 of sheet metal of the proper gauge, preferably at an inclination of about forty-five degrees, and the blade portions 23 are cut by a single line 24 between the blade portions of adjacent blanks, which, because adjacent blanks are reversed, is the shear edge and is later bevelled and ground as the shearing edge of the finished blade. The opposite or back edge of each blade is also cut on a common line between two adjacent blanks, as indicated at 25. Two blanks, A and B, having adjacent blade portions, are reversed or arranged so that the blade and handle portions extend in opposite directions, and the handle portions 26 to form the finger loops are thus cut side by side from the blanks of alternate blade portions A—A or B—B, and adjacent the opposite outer edges of the strip of stock material 22. Also, in cutting the handle portions for the finger loops 14 the outer convex edge 19 of this loop is cut on the same line as the inner concave edge 18 of the bowed or curved shank 15 connecting the finger loop to the blade. Therefore, the inner concave edge 18 of the shank is of the same shape as the convex outer edge 19 of the finger loop, and as the blanks are all of the same shape and size the inner concave edge 18 of the shank is the same shape as the outer convex edge 19 of the connected loop 26, which is also the same shape as the convex outer edge 19 of the loops of all of the blanks. Also, this convex outer edge 19 is a continuation of the outer end of the convex edge 17 of the shank, and the inner convexly curved edge 20 of the loop is a continuation of the outer end of the inner concave edge of the shank. This provides a widened portion 27 between the blade and the shank for the overlapping riveted connection between the blades of scissor members in completing the scissors. After cutting these blanks they are forged and shaped or worked to provide the proper contours and shapes to the blades 11, the looped finger grips 14, and the shanks 15, the blades being bevelled to reduce the shear edge to the proper thickness and bevel, after which it is ground, and the finger loops 14 and shanks 15 being formed to a rounded cross section.

It will be seen from Fig. 4 that this shape and form of the scissor elements or members permits their being cut from the metal stock by common cutting lines between them, thus reducing to a minimum the amount of scrap or waste stock left after cutting the blanks, the only waste being the substantially triangular shaped portions 28 between adjacent loops 14 at the outer edges of the stock and the substantially circular discs 29 cut from the inside of the finger loop. This therefore greatly increases the number of blanks which may be cut from a given amount of stock, and greatly reduces the amount of scrap or waste, and therefore greatly reduces the cost of making the scissors, as well as reducing the amount of expensive material which must be used to manufacture a given number of scissors.

Having thus set forth the nature of my invention, I claim:

1. The steps in the method of making a scissors member comprising cutting a series of blanks side by side from sheet metal of the desired thickness, the blanks each comprising a blade portion having a shear edge and a back edge laterally spaced, a handle portion comprising a generally ring shaped finger loop having an outer convex edge and connected to one end of the blade portion by a curved shank bowed in the direction of the said shear edge with a concave inner edge, the blanks being cut from the sheet metal with adjacent blanks in reversed positions with their handle and blade portions extending in opposite directions, the back edges of adjacent blade portions and the shear edges of adjacent blade portions being cut on common lines, and the outer convex edge of the loop of each blank being cut on a common line and of the same shape as the inner convex edge of the shank of the next alternate blade.

2. The steps in the method of making a scissors member comprising a blade portion and a handle portion connected to one end of the blade portion by a curved shank, comprising cutting a series of blanks side by side from sheet metal of the desired thickness, the blanks each comprising a blade portion having opposite shear and back edges, a handle portion in the form of a generally ring shaped finger loop having an outer convex edge and a connecting shank between the blade and handle portions curved and bowed toward the shear edge of the blade portion with a concave inner edge, cutting the blanks from the sheet metal with the blade portions of adjacent blanks side by side and extending in opposite directions and with the handle portions of alternate blanks side by side and extending in the same direction, the back edges and shear edges of adjacent blade portions being cut on common lines, and the inner concave edge of the curved shank of each blank being cut on a common line and to the same shape as the outer convex edge of the finger loop of the next alternate blank.

References Cited in the file of this patent

UNITED STATES PATENTS

| | | |
|---|---|---|
| 69,960 | Barnard | Oct. 22, 1867 |
| 151,179 | Waldie | May 19, 1874 |
| 1,111,245 | Berg | Sept. 22, 1914 |
| 1,990,694 | Jacobs | Feb. 12, 1935 |
| 2,369,673 | Hartkopp | Feb. 20, 1945 |
| 2,434,268 | Hartkopp | Jan. 13, 1948 |
| 2,577,316 | Ern | Dec. 4, 1951 |
| 2,627,656 | Richartz | Feb. 10, 1953 |
| 2,708,311 | McCloud | May 17, 1955 |